United States Patent [19]

Fukuda et al.

[11] Patent Number: 5,362,533
[45] Date of Patent: Nov. 8, 1994

[54] RUBBER COMPOSITION

[75] Inventors: Hideo Fukuda, Yokohama; Hideyoshi Shimoda, Kamakura, both of Japan

[73] Assignee: Nippon Zeon Co., Ltd., Tokyo, Japan

[21] Appl. No.: 14,994

[22] Filed: Feb. 5, 1993

[30] Foreign Application Priority Data

Feb. 8, 1992 [JP] Japan ................. 4-056949

[51] Int. Cl.$^5$ ............ C08L 9/02; C08L 23/26; C08L 33/04; C08L 19/00
[52] U.S. Cl. ................. 428/36.8; 525/194; 525/192; 525/222; 525/230; 525/233
[58] Field of Search .............. 525/233, 230, 222; 428/36.8

[56] References Cited

U.S. PATENT DOCUMENTS

| | | | |
|---|---|---|---|
| 3,830,881 | 8/1974 | Woods et al. | 525/222 |
| 4,397,987 | 8/1983 | Cornell | 525/75 |
| 4,409,365 | 10/1983 | Coran et al. | 525/78 |
| 4,560,729 | 12/1985 | Watanabe et al. | 525/233 |
| 4,576,992 | 3/1986 | Buding et al. | 525/233 |
| 4,675,248 | 6/1987 | Buding et al. | 525/222 |
| 4,725,637 | 2/1988 | Fernyhough et al. | 525/222 |
| 4,845,145 | 7/1989 | Hazelton et al. | 525/233 |
| 4,849,478 | 7/1989 | Mori et al. | 525/233 |
| 4,877,827 | 10/1989 | Van Der Groep | 525/222 |
| 4,983,678 | 1/1991 | Saito et al. | 525/233 |

FOREIGN PATENT DOCUMENTS 57-096032  6/1982  Japan ................. 525/233

Primary Examiner—Carman J. Seccuro, Jr.
Attorney, Agent, or Firm—Armstrong, Westerman, Hattori, McLeland & Naughton

[57] ABSTRACT

A rubber composition including (i) a partially hydrogenated unsaturated nitrile-conjugated diene copolymer having an iodine value not larger than 120, (ii) an ethylene-propylene copolymer and (iii) a material selected from an ethylene-vinyl acetate copolymer, an acrylic rubber and a halogenated butyl rubber. The rubber composition prodides a vulcanized rubber having an improved constant-elongation fatigue performance, as well as balanced thermal resistance, oil resistance and other properties.

15 Claims, 2 Drawing Sheets

RUBBER COMPOSITION

BACKGROUND OF THE INVENTION (1) Field of the Invention

This invention relates to a covulcanizable rubber composition comprising (1) a partially hydrogenated unsaturated nitrile-conjugated diene copolymer, (2) an ethylene-propylene copolymer and (3) at least one material selected from the group consisting of an ethylene-vinyl acetate copolymer, an acrylic rubber and a halogenated butyl rubber. It further relates to rubber articles made by shaping and vulcanizing the rubber composition.

(2) Description of the Related Art

A partially hydrogenated unsaturated nitrile-conjugated diene copolymer (hereinafter abbreviated to "HNBR") is well known as a rubber having good heat-aging resistance, oil resistance and rancid gasoline resistane. To utilize these good characteristics and impart other characteristics to this rubber, proposals have heretofore been made wherein the copolymer is blended with other rubbers. Among the rubber blends, a blend thereof with an ethylene-propylene copolymer (hereinafter abbreviated to "EPM") is well known as a rubber composition having good heat-aging resistance, oil resistance and weather resistance (Japanese Unexamined Patent Publication No. 58-40332, 61-40342, 61-283639 and 62-190241). However, the partially hydrogenated unsaturated nitrile-conjugated diene copolymer rubber and EPM have greatly different solubility parameters and hence, when mixed together, it is almost impossible that they form a uniformly dispersed mixture. Further, these copolymer rubbers exhibit different rates of vulcanization, and therefore, properties of a vulcanized rubber from the composition of these copolymer rubbers are restricted. Especially, the constant-elongation fatigue properties are poor.

SUMMARY OF THE INVENTION

An object of the invention is to provide a rubber composition comprising HNBR and EPM, which is characterized as exhibiting an improved covulcanizable property, and as providing a vulcanized rubber having a drastically improved constant-elongation fatigue property.

In accordance with the present invention, there is provided a rubber composition comprising (1) HNBR having an iodine value not larger than 120, (2) EPM and (3) at least one material selected from an ethylene-vinyl acetate copolymer (hereinafter abbreviated to "EVA"), an acrylic rubber (hereinafter abbreviated to "AR") and a halogenated butyl rubber (hereinafter abbreviated to "halogenated IIR").

DESCRIPTION OF THE PREFERRED EMBODIMENTS

Figure 1:
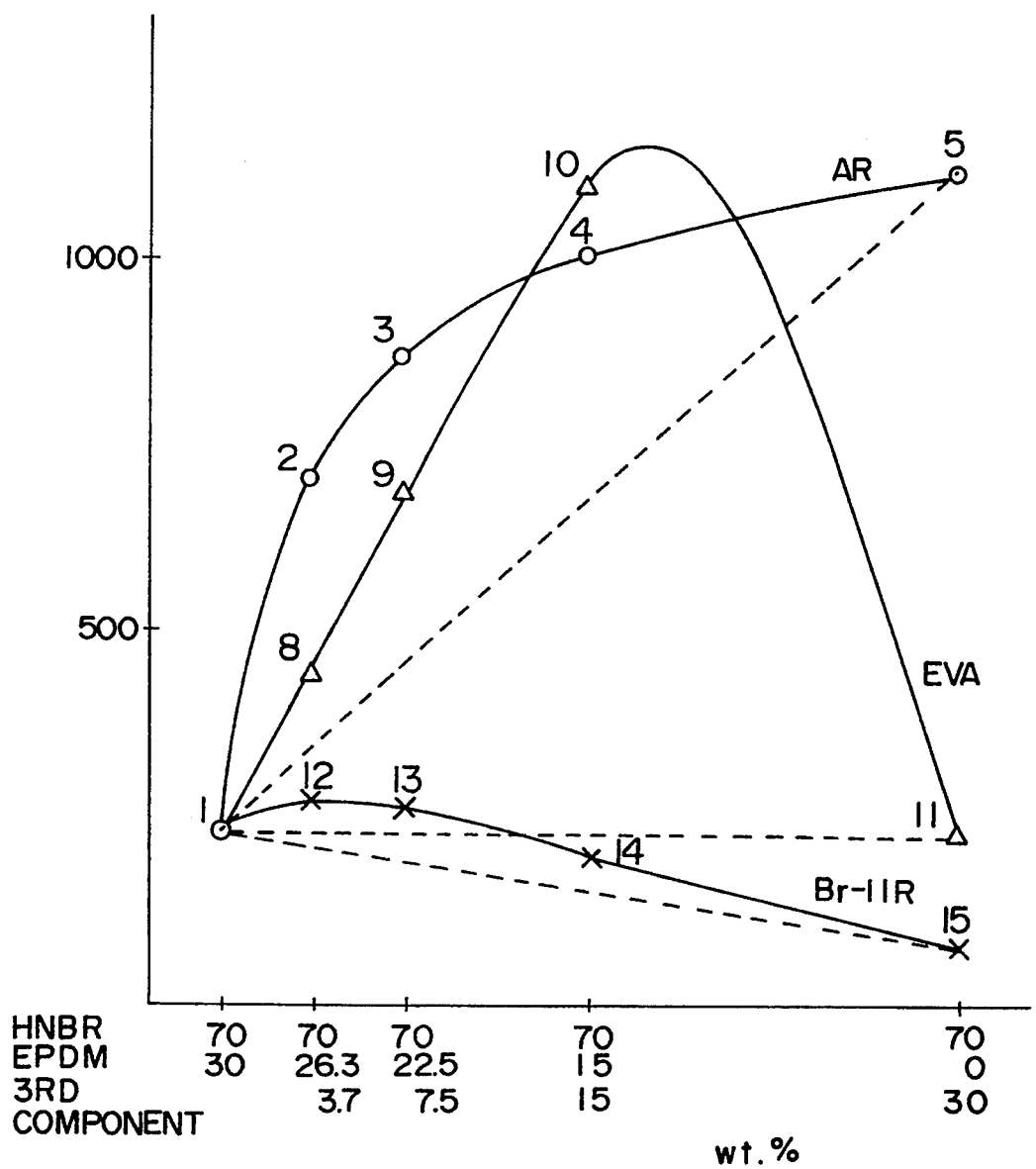
FIG. 1 is a graph showing a relationship of the composition of the rubber composition of the invention with the constant-elongation fatigue performance expressed in terms of the number of times at which a sample of the vulcanized rubber composition was broken when the fatigue performance was tested.

HNBR used in the invention is prepared by partially hydrogenating an unsaturated nitrile-conjugated diene copolymer rubber by a conventional method, for example, a method described in Japanese Examined Patent Publication No. 60-58242 and 62-61045, the latter copolymer rubber being prepared, for example, by an emulsion polymerization or solution polymerization procedure.

As specific examples of the unsaturated nitrile used in the invention, there can be mentioned acrylonitrile and methacrylonitrile. As specific examples of the conjugated diene, there can be mentioned 1,3-butadiene, 2,3-dimethylbutadiene, isoprene and 1,3-pentadiene. If desired, the unsaturated nitrile and the conjugated diene can be copolymerized with one or more ethylenically unsaturated monomers. As specific examples of the copolymerizable ethylenically unsaturated monomers, there can be mentioned unsaturated carboxylic acids such as acrylic acid, methacrylic acid, itaconic acid and maleic acid, and salts thereof, alkyl esters of unsaturated carboxylic acids such as methyl acrylate and butyl acrylate, alkoxyalkyl esters of unsaturated carboxylic acids such as methoxy acrylate, ethoxyethyl acrylate, methoxyethoxyethyl acrylate, acrylamide, methacrylamide, N-substituted acrylamides such as N-methylolacrylamide, N,N'-di-methylolacrylamide and N-ethoxymethylacrylamide, and N-substituted methacrylamides such as N-methylolmethacrylamide, N,N'-dimethylolmethacrylamide and N-ethoxymethylmethacrylamide. In unsaturated nitrile-ethylenically unsaturated monomer copolymer rubbers, the ethylenically unsaturated monomer can be partially substituted by non-conjugated dienes such as vinylnorbornene, dicyclopentadiene and 1,4-hexadiene.

As specific examples of HNBR used in the invention, there can be mentioned hydrogenated products of a butadieneacrylonitrile copolymer rubber (hereinafter abbreviated to "NBR"), an isoprene-butadiene-acrylonitrile copolymer rubber and an isoprene-acrylonitrile copolymer rubber, and hydrogenated products of a butadiene-methyl acrylateacrylonitrile copolymer rubber and a butadiene-acrylic acid-acrylonitrile copolymer rubber.

The content of the bound unsaturated nitrile in the unsaturated nitrile-conjugated diene copolymer rubber is usually 5 to 60% by weight, preferably 10 to 50% by weight for the desired oil resistance.

The iodine value of the partially hydrogenated unsaturated nitrile-conjugated diene rubber is 0 to 120, preferably 0 to 80. If the iodine value exceeds 120, the thermal resistance is reduced.

EPM used in the invention is a copolymer rubber made by copolymerization of ethylene and propylene (the ratio of ethylene to propylene is from 90/10 to 20/80 by weight) and an optional non-conjugated diene. As the specific examples of the non-conjugated diene, there can be mentioned dicyclopentadiene, methyltetrahydroindene, methylene-norbornene, ethylidene-norbornene and 1,4-hexadiene. Of these, ethylidene-norbornene and dicyclopentadiene are preferable in the invention. The amount of the non-conjugated diene used as the optional copolymer is preferably such that the resulting copolymer has an iodine value of 3 to 35.

EVA used in the invention is not particularly limited provided that it is a copolymer of ethylene and vinyl acetate. EVA may be either rubbery or resinous. Usually EVA used in the invention has a vinyl acetate content of 5 to 90% and a melt index of 0.1 to 200.

AR used in the invention is a rubber composed of a copolymer of 30 to 99.9% by weight of an alkyl acrylate and/or an alkoxyalkyl acrylate, 0.1 to 10% by weight of a crosslinkable monomer and 0 to 70% by weight of other copolymerizable ethylenically unsaturated monomers.

The alkyl acrylate used for the preparation of AR preferably has an alkyl group having 1 to 8 carbon atoms, more preferably 2 to 4 carbon atoms. As specific examples of the alkyl acrylate, there can be mentioned methyl acrylate, ethyl acrylate, propyl acrylate, butyl acrylate, hexyl acrylate, cyclohexyl acrylate and octyl acrylate. The alkoxyalkyl acrylate used for the preparation of AR preferably has an alkyl group of 1 to 4 carbon atoms having an alkoxy substituent having 1 to 4 carbon atoms. Namely, the alkoxyalkyl acrylate preferably has an alkoxyalkyl group having 2 to 8 carbon atoms. As specific examples of the alkoxyalkyl acrylate, there can be mentioned, methoxymethyl acrylate, methoxyethyl acrylate, ethoxyethyl acrylate and butoxyethyl acrylate.

The crosslinkable monomer used for the preparation of AR is not particularly limited, and has a crosslinking site such as, for example, an active halo group, an epoxy group, an unsaturated group or a carboxyl group. The active halo group-containing unsaturated monomer includes, for example, 2-chloroethyl vinyl ether, vinyl chloroacetate, allyl chloroacetate, vinylbenzyl chloride, 2-chloroethyl vinyl ether, chloromethyl vinyl ketone and 5-chloromethyl-2-norbornene. The epoxy group-containing monomer includes, for example, glycidyl acrylate, glycidyl methacrylate, allyl glycidyl ether and vinyl glycidyl ether. The unsaturated group-containing monomer includes, for example, ethylidene-norbornene. The carboxyl group-containing monomer includes, for example, acrylic acid.

The ethylenically unsaturated monomer to be copolymerized with the alkyl acrylate and/or the alkoxyalkyl acrylate, and the crosslinking monomer is optionally used depending upon the desired properties of the rubber composition. As specific examples of the ethylenically unsaturated monomer, there can be mentioned, for example, acrylonitrile, vinyl acetate, styrene, α-methylstyrene, acrylamide, vinyl chloride and vinylidene chloride.

Halogenated IIR used in the invention is prepared by halogenating, preferably chlorinating or brominating a butyl rubber copolymerized from isobutylene and isoprene. The amounts of isobutylene units and isoprene units in the butyl rubber are 90 to 99.5% by weight and 0.5 to 10% by weight, respectively, and the amount of chlorine or bromine added to the butyl rubber is 0.5 to 3% by weight.

The amounts of the respective ingredients in the rubber composition is preferably such that HNBR is 40 to 90% by weight, EPM is 5 to 40% by weight and the material selected from EVA, AR and halogenated IIR is 5 to 20% by weight, based on the total weight of these three ingredients. More preferably, the amounts of HNBR, EPM and the material selected from EVA, AR and halogenated IIR are 45 to 80% by weight, 10 to 40% by weight and 5 to 15% by weight, respectively. It is preferable that the amounts of EPM and the material selected from EVA, AR and halogenated IIR are 20 to 80% by weight and 80 to 20% by weight, respectively, based on the sum of EPM and said material. The optimum proportion of the aforesaid three ingredients in the rubber composition is determined depending upon the intended use of the rubber composition.

Provided that the object of the invention can be achieved, the rubber composition of the invention may have further incorporated therein conjugated diene rubbers or other rubbers.

The vulcanizable rubber composition of the invention is prepared by blending the above-mentioned three ingredients, a vulcanizer and a vulcanizing accelerator, and optional additives such as a filler, for example, carbon black or silica, a reinforcer, a plasticizer and an aging stabilizer by using a mixer such as a roll or a Banbury mixer.

The vulcanizer used is not particularly limited, but is preferably an organic peroxide vulcanizer which is a common vulcanizer to the above-mentioned three ingredients. As specific examples of the organic peroxide vulcanizers, there can be mentioned di-t-butylperoxide, t-butylcumylperoxide, dicumylperoxide, 2,5-dimethyl-2,5-di(t-butylperoxy)-hexane, 2,5-dimethyl-2,5-di-(t-butylperoxy)-hexyne-3, 1,3-bis-(t-butylperoxy-isopropyl)benzene, 1,1-di-t-butylperoxycyclohexane, t-butyl perbenzoate and t-butylperoxy-isopropyl carbonate. The amount of the vulcanizer in the rubber composition of the invention is preferably 1 to 10% by weight based on the weight of the rubber composition.

Vulcanized products obtained from the rubber composition of the invention have balanced thermal resistance and oil resistance and a very enhanced constant-elongation fatigue performance and a good vibration-damping property. Therefore, the rubber composition is used widely for the production of various hoses and vibration insulators.

The rubber composition of the invention will now be specifically described by the following examples.

In the examples, the constant-elongation fatigue performance, the dynamic loss factor and the stiffness ratio were determined as follows. The other physical properties were determined according to JIS K-6301.

Constant-elongation Fatigue Performance

A vulcanized sheet having a thickness of 2 mm was cut into a dumbbell sample of JIS No. 3. The sample was set to a de Mattia flexing machine (supplied by Ueshima Seisakusho K.K.) so that the gripping end of the sample was capable of moving until the sample was drawn to the maximum length of 150% based on the original length (i.e., the maximum elongation was 50%). The cycle of drawing and shrinking was repeated at room temperature and the number of times at which the sample was broken was counted. This test was repeated on ten samples and the constant-elongation fatigue performance was expressed by the average number of times at break.

Dynamic Loss Factor

The dynamic loss factor was determined according to JIS K-6394 wherein a sample of N1-form was used and the measurement was carried out under the conditions of room temperature, 15 Hz and ±2% of the compressive strain by using a hydraulic servo dynamic tester supplied by Saginomiya Seisakusho K.K.

Stiffness Ratio

Stiffness ratio is the ratio of a dynamic spring constant to a static spring constant. The dynamic spring constant was determined according to JIS K-6394 wherein a sample of N1-form was used and the measurement was carried out under the conditions of room temperature, 100 Hz and ±0.2% of the compressive strain. The static spring constant was determined according to JIS K-6385 on a sample of N1-form.

EXAMPLE 1

Using a hydrogenated acrylonitrile-butadiene copolymer rubber (hydrogenated NBR), an ethylene-propylenediene copolymer rubber (EPDM) and an acrylic rubber (AR), rubber compositions (Run No 1 through 7) were prepared according to the recipes shown in Table 1.

The hydrogenated NBR used had a bound acrylonitrile content of 36% by weight and an iodine value of 28. The EPDM was an ethylene-propylene-dicyclopentadiene terpolymer having a propylene content of 37% by mole and an iodine value of 7. The acrylic rubber was a copolymer prepared by the copolymerization of 30% by weight of ethyl acrylate, 40% by weight of butyl acrylate, 27% by weight of methoxyethyl acrylate and 3% by weight of a crosslinking epoxy monomer.

In the preparation of the rubber compositions, Ft carbon, Mt carbon, MgO, a vulcanizing aid (N,N'-m-phenylene-dimaleimide), an organic peroxide vulcanizer (1,3-bis(tert.-butylperoxyisopropyl)benzene) and a plasticizer (trimelitic acid ester plasticizer "C-9N" supplied by Adeca Argus Co.) were incorporated in the rubber compositions according to the recipe shown in Table 1.

Each rubber composition was press-vulcanized at a temperature of 170° C. for 30 minutes to prepare a vulcanized sheet having a thickness of 2 mm. The physical properties of this vulcanized sheet were determined. The results are shown in Table 1.

TABLE 1

| Run No. | 1 | 2 | 3 | 4 | 5 | 6 | 7 |
|---|---|---|---|---|---|---|---|
| Recipe (parts by weight) | | | | | | | |
| HNBR | 70 | 70 | 70 | 70 | 70 | 50 | 50 |
| EFD | 30 | 26.3 | 22.5 | 15 | — | 50 | 37.5 |
| AR | — | 3.7 | 7.5 | 15 | 30 | — | 12.5 |
| FT carbon | 40 | 40 | 40 | 40 | 40 | 40 | 40 |
| MT carbon | 60 | 60 | 60 | 60 | 60 | 60 | 60 |
| MgO | — | 0.6 | 1.3 | 2.5 | 5 | — | — |
| Vulcanizing aid | 3 | 3 | 3 | 3 | 3 | 3 | 3 |
| Vulcanizer | 7 | 7 | 7 | 7 | 7 | 7 | 7 |
| Plasticizer | 20 | 20 | 20 | 20 | 20 | 20 | 20 |
| Physical Properties of Vulcanized Rubber *1 | | | | | | | |
| $T_B$ *2 (kgf/cm$^2$) | 167 | 160 | 164 | 161 | 144 | 138 | 146 |
| $E_B$ *3 (%) | 130 | 140 | 140 | 150 | 150 | 120 | 130 |
| $M_{100}$ *4 (kgf/cm$^2$) | 104 | 99 | 96 | 89 | 83 | 105 | 107 |
| Hs *5 (point) | 72 | 72 | 72 | 71 | 68 | 72 | 73 |
| Compression Set after Maintained at 150° C. × 72 Hours *6 | 15 | 18 | 21 | 25 | 36 | 17 | 21 |
| Physical Properties after Maintained at 150° C. × 72 Hours *7 | | | | | | | |
| $T_B$ (kgf/cm$^2$) | 155 | 168 | 159 | 154 | 141 | 133 | 117 |
| $\Delta T_B$ *8 (%) | −7 | +5 | −3 | −4 | −2 | −4 | −20 |
| $E_B$(%) | 120 | 140 | 140 | 150 | 140 | 110 | 90 |
| $\Delta E_B$ *9 (%) | −8 | 0 | 0 | 0 | −7 | −8 | −31 |
| $M_{100}$ (kgf/cm$^2$) | 119 | 97 | 96 | 90 | 90 | 117 | — |
| $\Delta M_{100}$ *10 (%) | +14 | −2 | 0 | 1 | +8 | +11 | — |
| Hs (JIS) | 75 | 74 | 74 | 74 | 72 | 76 | 76 |
| $\Delta Hs$ *11 | +4 | +2 | +2 | +3 | +4 | +4 | +3 |
| Constant-elongation Fatigue Performance | | | | | | | |
| Times *12(× 1000) | 225 | 706 | 870 | 1003 | 1109 | 17 | 853 |
| Dynamic Mechanical Properties | | | | | | | |
| Loss factor *13 | 0.122 | 0.120 | 0.120 | 0.131 | 0.143 | 0.120 | 0.134 |
| Stiffness ratio | 1.82 | 1.63 | 1.65 | 1.73 | 1.81 | 1.70 | 1.77 |

Figure 2:
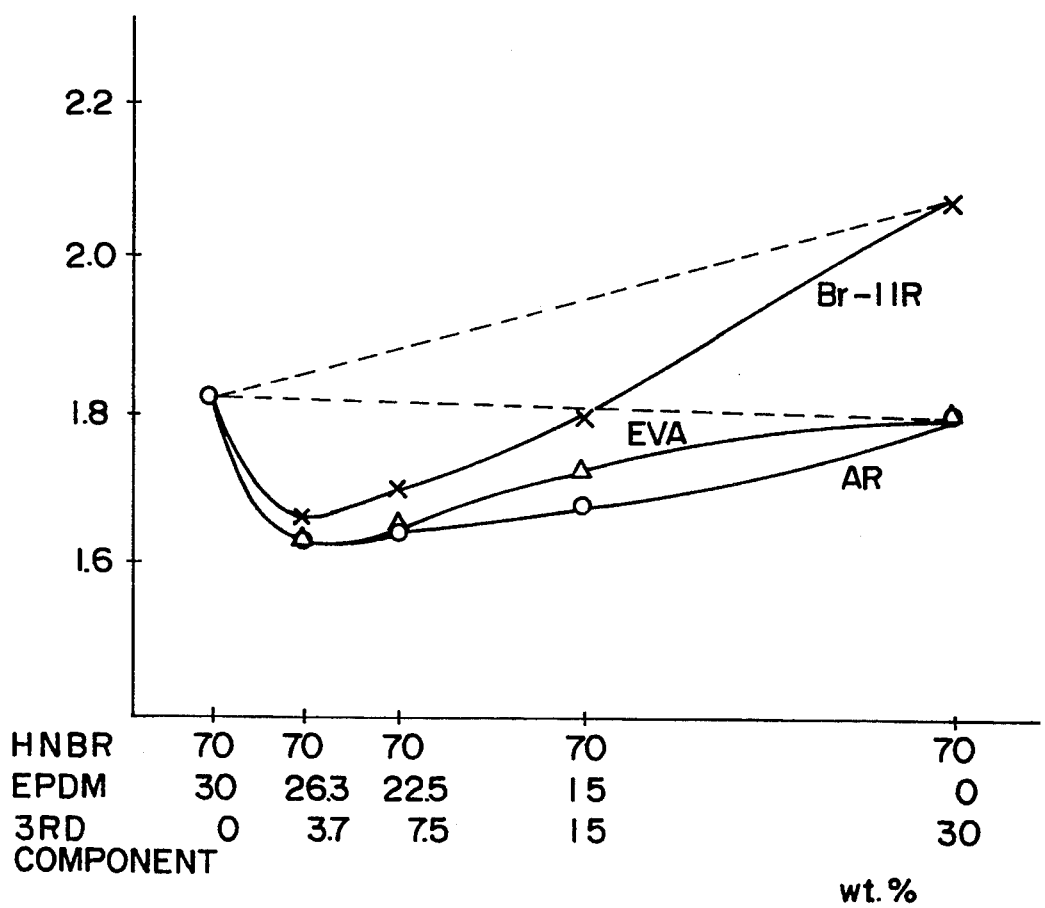
FIG. 2 is a graph showing a relationship of the composition of the rubber composition of the invention with the spring constant ratio of the vulcanized rubber composition.

Note:
*1 Physical properties as measured after vulcanization at 170° C. for 30 minutes
*2 $T_B$: Tensile strength at break
*3 $E_B$: Elongation at break
*4 $M_{100}$: Tensile stress at 100% elongation
*5 Hs: Hardness as determined according to JIS K-6301
*6 Compression set of the vulcanized sheet as measured after maintained at 150° C. for 72 hours
*7 Physical properties as measured after maintained at 150° C. for 72 hours
*8 $\Delta T_B$: Change of tensile strength by high-temperature aging at 150° C. for 72 hours
*9 $\Delta E_B$: Change of elongation by high-temperature aging at 150° C. for 72 hours
*10 $\Delta M_{100}$: Change of tensile stress at 100% elongation by high-temperature aging at 150° C. for 72 hours
*11 $\Delta H_s$: Change of hardness by high-temperature aging at 150° C. for 72 hours
*12 Constant-elongation fatigue performance, in the number of times at which sample was broken when tested at room temperature and at repeated elongation ranging from zero to 50%
*13 Dynamic loss factor The data of the constant-elongation fatigue performance and the spring constant ratio in Run No. 1 through 5 were shown in FIG. 1 and FIG. 2, respectively. In Run No 1 through 5, the amount of HNBR was the same and the amounts of EPDM and AR were varied. In FIG. 1, the ordinate indicates the number of times (the unit number of times is 1,000) at which the sample was broken when it was subjected to a cycle of drawing and shrinking in the flexing machine. The abscissa indicates the composition of the rubber composition wherein the upper line of numerals is the amount of HNBR, the second line is the amount of EPDM and the bottom line is the amount of the third component (i.e., acrylic rubber). The numerals accompanied by the graphs correspond to run numbers in Table 1. In FIG. 2, the ordinate indicates the stiffness ratio and the abscissa is the same as that of FIG. 1. In FIGS. 1 and 2, the solid lines were drawn by plotting the measured values, and the broken lines indicate the additivity in the constant-fatigue performance and stiffness ratio between the HNBR and EPDM and the additivity between the HNBR and AR.

As seen from the physical properties, especially the constant-elongation fatigue performance and the stiffness ratio, shown in Table 1, the vulcanized product of the rubber composition of the invention comprising HNBR, EPDM and AR exhibits excellent properties which are superior to the sum of HNBR plus EPDM and to the sum of HNBR plus AR. This fact will be more clearly seen from FIG. 1 and FIG. 2.

EXAMPLE 2

By the same procedures as in Example 1, vulcanizable compositions were prepared from the same HNBR and EPDM, as those in used in Example 1, and an ethylene-vinyl acetate copolymer (EVA) or a brominated butyl rubber (Br-IIR) wherein the recipes were changed as shown in Table 2. The EVA used had a vinyl acetate content of 26% by weight. The Br-IIR used had an iodine value of 6 and a bromine content of 2.0% by weight.

Each vulcanizable composition was press-vulcanized at a temperature of 170° C. for 30 minutes to prepare a vulcanized sheet having a thickness of 2 mm. The physical properties of the vulcanized sheet were evaluated. The results are shown in Table 2.

The data of the constant-elongation fatigue performance and the stiffness ratio in Run No. 8 through 15 are shown in FIG. 1 and FIG. 2, respectively.

As seen from Table 2, the vulcanizable rubber compositions of the invention which comprises HNBR, EPDM and EVA or Br-IIR exhibit a drastically improved constant-elongation fatigue performance which is comparable with the vulcanizable rubber composition comprising HNBR, EPDM and AR, as well as thermal resistance which is comparable with that of a conventional blend of HNBR with EPDM.

What is claimed is:

1. A rubber composite comprising (i) a partially hydrogenated unsaturated nitril-conjugated diene copolymer having an iodine value not larger than 120, (ii) an ethylene-propylene copolymer and (iii) at least one material selected from the group consisting of an ethylene-vinyl acetate copolymer, a rubber comprising a copolymer of 30 to 99.9% by weight at least one acrylate selected from the group consisting of an alkyl acrylate and an alkoxyalkyl acrylate, 0.1 to 10% by weight of a crosslinkable monomer and 0 to 70% by weight of at least one copolymerizable ethylenically unsaturated monomer, and a halogenated butyl rubber, wherein the amounts of the components (i), (ii) and (iii) are 40 to 90% by weight, 5 to 40% by weight and 5 to 20% by weight, respectively, based on the total weight of the these components (i), (ii) and (iii).

2. The rubber composition according to claim 1, wherein the amounts of the components (i), (ii) and (iii) are 45 to 80% by weight, 10 to 40% by weight and 5 to 15% by weight, respectively, based on the total weight of the three components (i), (ii) and (iii).

3. The rubber composition according to claim 1, wherein the amount of bound unsaturated nitrile in the component (i) is 5 to 60% by weight based on the weight of the component (i).

4. The rubber composition according to claim 1, wherein the iodine value of the component (i) is not

TABLE 2

| Run No. | 8 | 9 | 10 | 11 | 12 | 13 | 14 | 15 |
|---|---|---|---|---|---|---|---|---|
| Recipe (parts by weight) | | | | | | | | |
| HNBR | 70 | 70 | 70 | 70 | 70 | 70 | 70 | 70 |
| EF | 26.3 | 22.5 | 15 | — | 26.3 | 22.5 | 15 | — |
| EVA | 3.7 | 7.5 | 15 | 30 | — | — | — | — |
| Br-IIR | — | — | — | — | 3.7 | 7.5 | 15 | 30 |
| FT carbon | 40 | 40 | 40 | 40 | 40 | 40 | 40 | 40 |
| MT carbon | 60 | 60 | 60 | 60 | 60 | 60 | 60 | 60 |
| MgO | — | 1.3 | 2.5 | 5 | 0.6 | 1.3 | 2.5 | 5 |
| Vulcanizing aid | 3 | 3 | 3 | 3 | 3 | 3 | 3 | 3 |
| Vulcanizer | 7 | 7 | 7 | 7 | 7 | 7 | 7 | 7 |
| Plasticizer | 20 | 20 | 20 | 20 | 20 | 20 | 20 | 20 |
| Physical Properties of Vulcanized Rubber *1 | | | | | | | | |
| $T_B$ *2 (kgf/cm$^2$) | 179 | 181 | 199 | 209 | 160 | 156 | 142 | 106 |
| $E_B$ *3 (%) | 140 | 140 | 160 | 180 | 130 | 140 | 130 | 130 |
| $M_{100}$ *4 (kgf/cm$^2$) | 101 | 112 | 100 | 96 | 107 | 97 | 92 | 80 |
| Hs *5 (point) | 73 | 75 | 75 | 80 | 72 | 71 | 71 | 68 |
| Compression Set after Maintained at 150° C. × 72 hours *6 | 17 | 16 | 18 | 21 | 18 | 19 | 23 | 32 |
| Physical Properties after Maintained at 150° C. × 72 hours *7 | | | | | | | | |
| $T_B$ (kgf/cm$^2$) | 166 | 166 | 196 | 211 | 150 | 150 | 115 | 98 |
| $\Delta T_B$ *8 (%) | −7 | −8 | −2 | +1 | −6 | −4 | −19 | −8 |
| $E_B$ (%) | 140 | 140 | 160 | 180 | 130 | 130 | 110 | 110 |
| $\Delta E_B$ *9 (%) | 0 | 0 | 0 | 0 | 0 | −7 | −15 | −15 |
| $M_{100}$ (kgf/cm$^2$) | 102 | 100 | 100 | 100 | 100 | 96 | 98 | 87 |
| $\Delta M_{100}$ *10 (%) | +1 | −1 | 0 | +4 | −7 | −1 | +7 | +9 |
| Hs (point) | 75 | 76 | 78 | 81 | 74 | 74 | 74 | 74 |
| $\Delta Hs$ *11 | +2 | +1 | +3 | +1 | +2 | +3 | +3 | +6 |
| Constant-elongation Fatigue Performance | | | | | | | | |
| Times *12(× 1000) | 440 | 688 | 1101 | 232 | 275 | 260 | 202 | 85 |
| Dynamic Mechanical Properties | | | | | | | | |
| Loss factor *13 | 0.120 | 0.120 | 0.120 | 0.125 | 0.122 | 0.128 | 0.144 | 0.180 |
| Stiffness ratio | 1.63 | 1.64 | 1.68 | 1.82 | 1.66 | 1.70 | 1.81 | 2.09 |

Note: *1 through *13 are the same as those in the footnote in Table 1 larger than 80 and the amount of bound unsaturated nitrile in the component (i) is 10 to 50% by weight based on the weight of the component (i).

5. The rubber composition according to claim 1, wherein the component (i) is a partially hydrogenated product of an unsaturated nitrile-conjugated diene copolymer; said copolymer being selected from the group consisting of butadiene-acrylonitrile copolymer, an isoprene-butadiene-acrylonitrile copolymer and an isoprene-acrylonitrile copolymer.

6. The rubber composition according to claim 1, wherein the component (ii) is a bipolymer of 20 to 90% by weight of ethylene and 80 to 10% by weight of propylene, based on the total weight of the two monomers, or a terpolymer of 20 to 90% by weight of ethylene and 80 to 10% by weight of propylene, based on the total weight of the two monomers, and a non-conjugated diene in an amount such that the terpolymer has an iodine value of 3 to 35.

7. The rubber composition according to claim 6, wherein the non-conjugated diene is selected from dicyclopentadiene, ethylidene-norbornene, methyltetrahydroindene, methylene-norbornene and 1,4-hexadiene.

8. The rubber composition according to claim 1, wherein the ethylene-vinyl acetate copolymer has a vinyl acetate content of 5 to 90% by weight and a melt index of 0.1 to 200.

9. The rubber composition according to claim 1, wherein said alkyl acrylate has 1 to 8 carbon atoms in the alkyl group and said alkoxyalkyl acrylate has 2 to 8 carbon atoms in the alkoxyalkyl group, and said crosslinkable monomer has a crosslinking site selected from the group consisting of an active halo group, an epoxy group, an unsaturated group and a carboxyl group.

10. The rubber composition according to claim 1, wherein the halogenated butyl rubber is a chlorinated or brominated product of a copolymer of 90 to 99.5% by weight of isobutylene and 0.5 to 10% by weight of isoprene, based on the total weight of the isobutylene and isoprene; said product containing 0.5 to 3% by weight of chlorine or bromine based on the weight of the copolymer.

11. A vulcanizable rubber composition which comprises a rubber composition as claimed in claim 1, and 1 to 10% by weight, based on the weight of the vulcanizable rubber composition, of an organic peroxide vulcanizer.

12. A shaped rubber article made by shaping and curing the vulcanizable rubber composition as claimed in claim 11.

13. The shaped rubber article according to claim 12, which is a rubber hose.

14. The shaped rubber article according to claim 12, which is a vibration insulator.

15. The rubber composition according to claim 1, wherein the component (i) is a partially hydrogenated product of a butadiene-acrylonitrile copolymer.

* * * * *